US006338146B1

(12) United States Patent
Johnson et al.

(10) Patent No.: US 6,338,146 B1
(45) Date of Patent: Jan. 8, 2002

(54) METHOD AND APPARATUS FOR FAULT-TOLERANT, SCALABLE AND NON-BLOCKING THREE-PHASE FLUSHING FOR COMMITTING DATABASE TRANSACTIONS IN A CLUSTER OF MULTIPROCESSORS

(75) Inventors: Charles S. Johnson, San Jose; Shang-Shen Tung, Cupertino; Y. C. Cheung, San Jose; Muhammad Shariq, El Granada, all of CA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/163,812

(22) Filed: Sep. 30, 1998

Related U.S. Application Data

(60) Provisional application No. 60/060,534, filed on Sep. 30, 1997.

(51) Int. Cl.[7] .................................................. G06F 11/07
(52) U.S. Cl. .............................................. 714/4; 714/13
(58) Field of Search ................................. 714/2, 4, 7, 13; 709/203; 710/100; 370/223, 216; 340/825.14, 825.16

(56) References Cited

U.S. PATENT DOCUMENTS 4,683,563 A * 7/1987 Rouse et al.
5,757,526 A * 5/1998 Shiragaki et al.

FOREIGN PATENT DOCUMENTS

EP     0 295 424 A3    10/1988            G06F/11/14

OTHER PUBLICATIONS

"Transaction Processing: Concepts and Technologies," Gray et al., 1993, Morgan Kaufmann Publishers, Inc., San Mateo, CA, pp. 132–138 and 562–568.
ACM Transactions on Database Systems, vol. 17, No. 1, Mar. 1992, New York, N.Y., pp. 94–162.
Sigmod Record, vol. 21, No. 2, Jun. 1992, New York, N.Y., pp. 371–380, C. Mohan et al. "ARIES/IM: An Efficient and High Concurrency Index Management Method Using Write–Ahead Logging".

* cited by examiner

Primary Examiner—Gopal C. Ray
(74) Attorney, Agent, or Firm—Oppenheimer Wolff & Donnelly

(57) ABSTRACT

An apparatus, method and medium for implementing fault-tolerant three-phase flushing for database transaction commits in a cluster including multiple nodes of shared-memory processors. The apparatus, method and medium include executing the primary of a commit coordinator process pair on a first of the nodes and executing its backup on a second node, executing the primary of a resource manager process pair on a third node and executing its backup on a fourth, and executing the primary of a Log process pair on a fifth node and executing its backup on a sixth. The first and second nodes as distinct from each other, as are the third and fourth nodes, as are the fifth and sixth nodes.

5 Claims, 11 Drawing Sheets

METHOD AND APPARATUS FOR FAULT-TOLERANT, SCALABLE AND NON-BLOCKING THREE-PHASE FLUSHING FOR COMMITTING DATABASE TRANSACTIONS IN A CLUSTER OF MULTIPROCESSORS

This application is a continuation of and claims the benefit of application Ser. No. 60/060,534, filed Sep. 30, 1997, the disclosure of which is incorporated herein by reference.

BACKGROUND OF THE INVENTION

This invention relates generally to database transactions on fault-tolerant multi-processor systems. In particular, this invention relates to methods for flushing in the commit phase of database transactions on cluster computer systems.

FIG. 1 illustrates a network node 100 in a multi-node system of the prior art. In FIG. 1, the node 100 includes loosely coupled processors 110 containing execution spaces 120 connected by a bus 130. The system 100 is a flat arrangement of the processors 1 10.

This bus-and-processor arrangement constitutes a single network node 100 on a network 140. The constituent processors 110 of the network node 100 have no shared memory processor (SMP) characteristics, e.g., memory sharing between some of the processors 110, and have no separate network presence.

The systems 100 and a subset of the processes thereon cooperate to provide a transaction service. The transaction service includes three elements: a commit coordinator, a resource manager and a Log. Each of the elements is a fault-tolerant process pair having primary and backup processes.

The primary and backup of each process pair are located at the same network address, i.e., at the address of the single network node 100 running both processes. Thus, for example, if the node 100 of the primary commit coordinator process becomes unavailable to the network 140, the backup commit coordinator process becomes offline as well. Process pairs implementing transaction services are described in the book entitled "TRANSACTION PROCESSING: CONCEPTS AND TECHNIQUES", by Gray et al., 1993, Morgan Kaufmann Publishers, Inc, San Mateo, Calif., at pages 132–138.

A standard two-phase commit algorithm is described pages 562–568 of the above referenced book by Gray et al. The two-phase commit algorithm involves the following steps:

PREPARE: send a flush broadcast invoking each resource manager involved in the transaction to vote on whether to commit;

DECIDE: collect flush results of voting, if all vote yes write the transaction commit log record;

COMMIT: invoke each involved resource manager telling it the commit decision; and COMPLETE: when all acknowledge the commit message force-write a commit completion record to the log.

The prepare phase is also called phase 1 of the commit and commit phase is called phase 2.

In a prior art system a primary and backup commit coordinator are both located on a single network node. Any processor failure of other node related failure causes the entire node to become inoperative, i.e., the granularity of failure is the entire node. The sharing of a network address between primary and backup commit coordinator processes in the prior art system 100 prevents that system from being non-blocking because a failure of the node at shared network address disables the commit operation. The flushing of resource managers in such an arrangement is not truly non-blocking in the classic network sense.

SUMMARY OF THE INVENTION

Accordingly, one goal of the invention is a transaction processor in which processors are either connected to each other using SMP memory sharing with tightly-coupled synchronization primitives (first tier) or connected across the network (second tier).

Such a configuration is two-tiered, with "near processor" and "far processor/node" relationships. The prior art configuration has two execution space contexts: here and there. The new configuration has three execution contexts: here, near-there, and far-there.

According to one aspect of the invention, a transaction service includes a three-phase algorithm requiring a backup commit coordinator process at a different network location than the primary.

According to one aspect of the invention, the primary and backup commit coordinator processes in the process pair are executing on different nodes having different network processes. Upon receiving the flush results the primary commit coordinator synchronizes the results to the backup commit coordinator utilizing a network message system so that the flush results are durably recorded at separate network nodes. Thus, the failure of any systems on either node will not result in a loss to the flush results.

According to another aspect of the, all processors in the node are coupled to a shared memory. Messages between processors in a node are implemented by memory copying. Each processor has an associated execution space in the shared memory with processes being attached to an execution space. During synchronization the messages are transferred from the execution space having the primary commit coordination attached in a first node to the execution space having the backup commit coordinator attached in a second node.

According to another aspect of the invention all processes of a transaction service are implemented as process pairs having primary and backup processes executing on different nodes having a different network presence.

Other features and advantages of the invention will be apparent in view of the following detailed description and appended drawings.

DESCRIPTION OF THE SPECIFIC EMBODIMENTS

Figure 1:
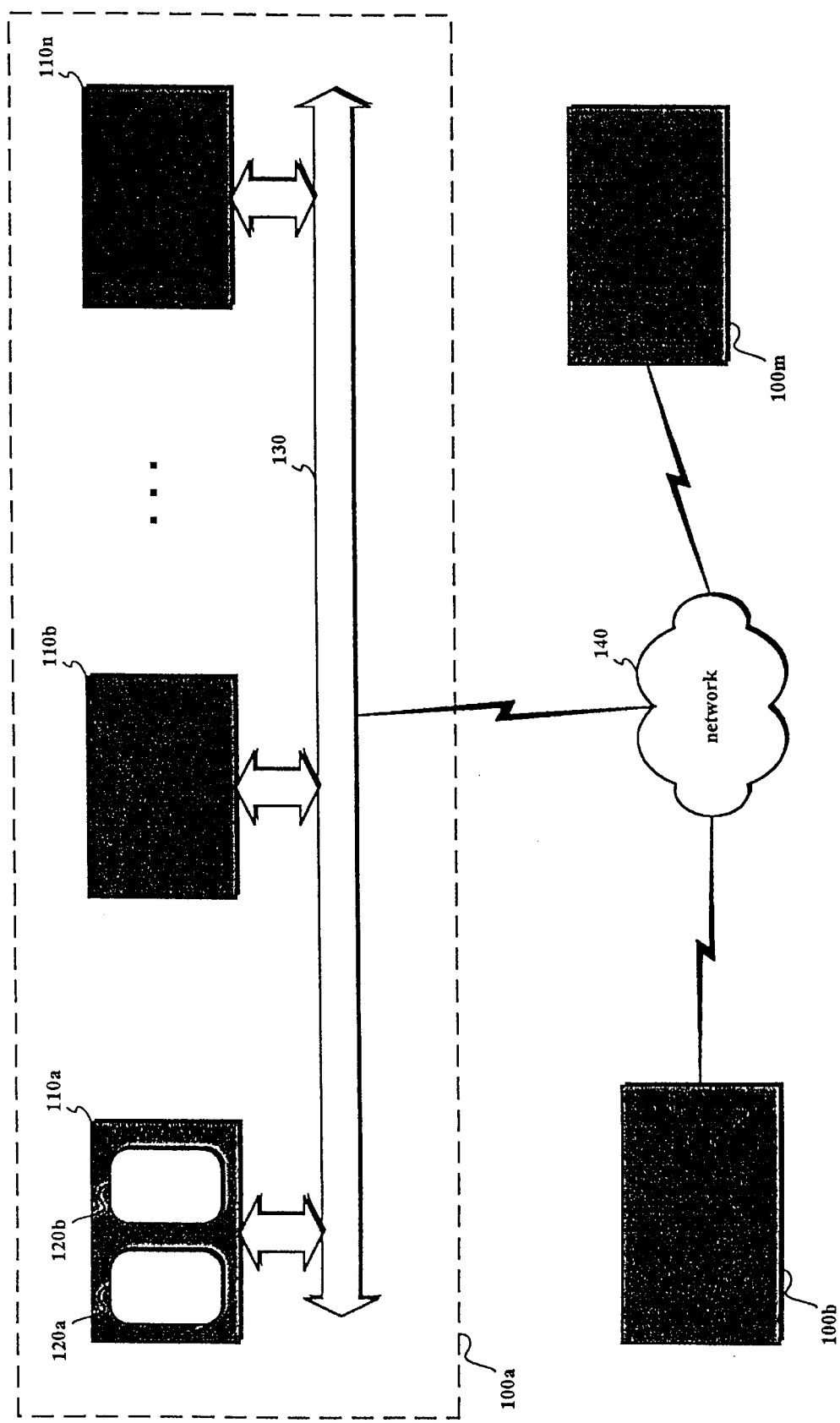
FIG. 1 illustrates a network node in a multi-node system of the prior art.
Figure 2:
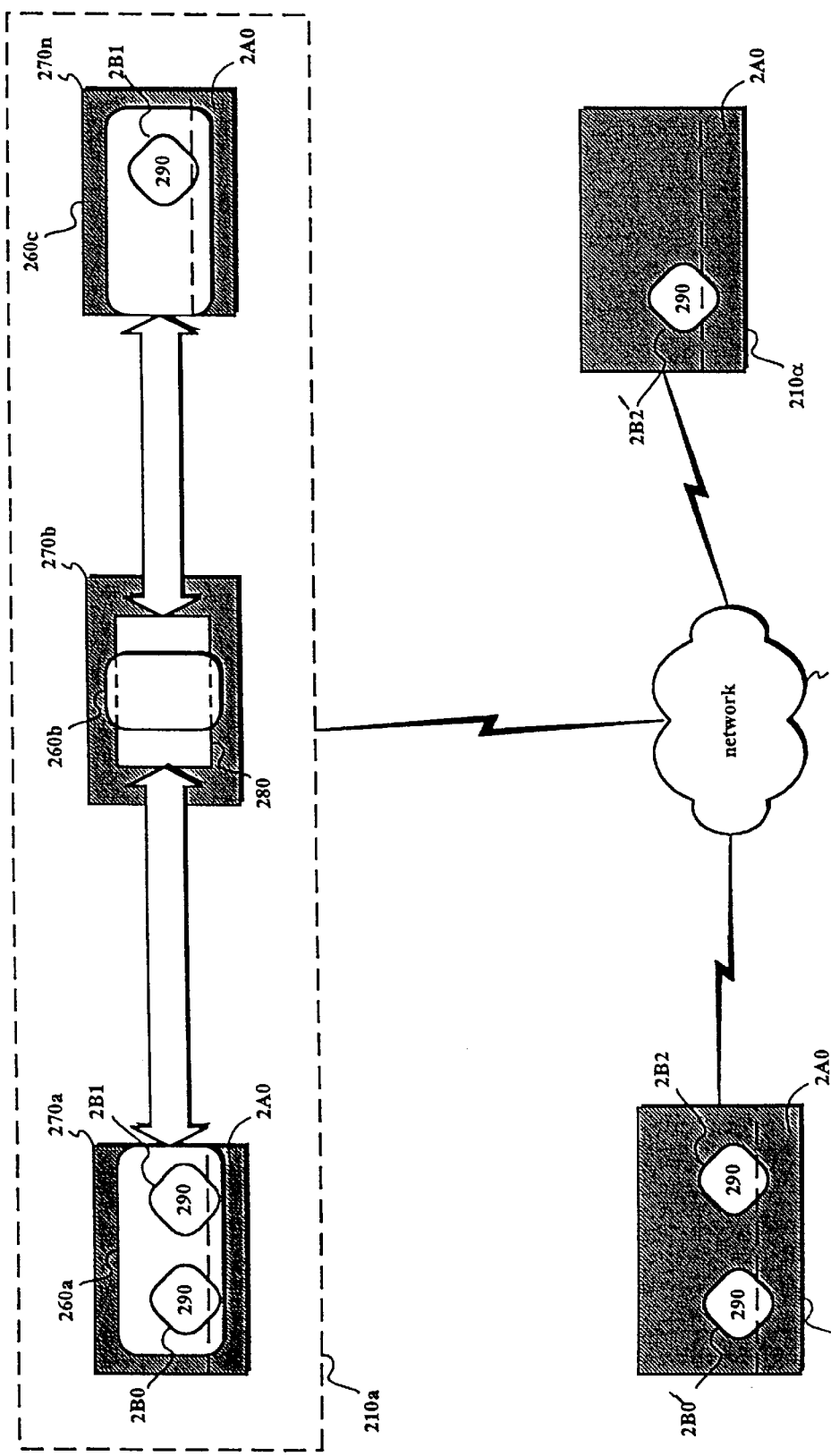
FIG. 2 illustrates multiple SMP nodes composing a cluster according to the invention.

FIG. 2 illustrates multiple shared-memory-processor (SMP) nodes 210a, 210b, ..., 210a composing a cluster 200 according to the invention. Each SMP node 210 contains multiple processors 270 with shared memory 280. An SMP node 210 is the incremental unit of expansion for the cluster 200.

Standard network protocols well-known in the art interconnect the SMP nodes 210 by means of a network fabric 220. Each SMP node 210 is independently addressable over the network 220. A message system provides inter-process communications between any two processes 290 in the cluster 200 in a manner independent of the location of the SMP node 210 of either process.

The SMP nodes 210 and a subset of the processes 290 thereon cooperate to provide a distributed transaction service. The transaction service runs as a service (with a dynamically linked library (DLL) 2A0) in every SMP node 210 of the cluster 200. The transaction service is a cluster presence, responding to changes in the state of the cluster 200 by adjusting the fabric of the transaction service to account for those changes. Such changes include, for example, the failure and subsequent recovery of various elements of the cluster 200.

The transaction service includes three elements: a commit coordinator 2B0, resource managers 2B1 and a Log 2B2. Each of the elements 2Bx is a fault-tolerant process pair, having both primary and backup processes 290. Each process 290 of a pair 2Bx has a network presence, i.e., each process 290 is in a different SMP node 210 at a different network address than its pair. Each process 290 may be required to take over from its pair at any time during the performance of transactional logic. The transaction service handles that takeover, preserving integrity in the database and maintaining transactional properties.

The commit coordinator 2B0 writes the transaction commit and abort records to the Log 2B2 using message system network messages. The primary process 290 in the commit coordinator process pair 2B0 maintains the ability of the backup process 290 to switch roles and takeover by sending checkpoint messages from the primary 290 to the backup 290 via the message system.

Likewise, the primary process 290 of a resource manager process pair 2B1 and the primary process 290 of the Log process pair 2B2 update their respective backup processes 290 through message system messages, keeping the backup processes 290 in synchronization.

Transaction service synchronization focuses on the SMP processors 270, producing at least one synchronized execution space 260 per processor 270 in every SMP node 210 in the cluster 200. Each execution space 260 contains transaction service information relative to transactions and resource managers currently attached to the execution space, including the states and interrelationships of the transactions and managers, operations in progress (e.g., flushing), and other states globally accessible for processing by any transactional process or object.

The transaction service functioning in one execution space 260 uses a datagram service to communicate with a transaction service in another execution space 260. The datagram service uses network messages to communicate with the other transaction service when the other service is functioning in an execution space 260 in another SMP node 210 on the cluster 200 (far-there). The datagram service uses memory-copy messaging to communicate with the other transaction service when the other service is in an execution space 260 in the same SMP node 210 (near-there). Finally, the datagram service uses a self-gend calling mechanism to communicate with itself as a client (here).

Thus, the datagram service usage is symmetric across the cluster 200. Also, datagrams from any execution space 260 in one SMP node 210 and targeted for any execution space in another node 210 may be buffered together as time and execution flow permit.

The transaction service that an application invokes (typically via a DLL 2A0) is identified as the transaction beginner. The transaction beginner has no direct backup.

The default owner of a transaction is its transaction beginner. The transaction service in the node 210 containing the current primary process 290 of the commit coordinator 2B0 takes over the role of the transaction owner to complete the transaction if the transaction beginner fails.

Regarding the transaction beginner application's communication of a database update transaction to the resource manager 2B1, the assumptions are (1) that the complete creation of the transaction precedes any updates under that transaction; (2) that the resource manager 2B1 follows certain procedures, before any update occurs, to synchronize the transaction service in the node 210 containing the backup resource manager 290; and (3) that all transactional requests to resource managers for this transaction complete before the attempt to commit the transaction, otherwise an abort occurs. (Unilateral aborts occur out of sequence, by their nature.) A resource manager 2B1 sends all updates to the transaction database to the Log 2B2, using message system network messages, before the transaction service completes flushing for a transaction. Before any request to flush from the transaction service, a resource manager 2B1 may send database updates to the Log 2B2, following the well-known Write-Ahead-Log protocol (WAL) and using message system network messages.

As mentioned above, the transaction service handles the takeover of a constituent service by that service's backup process 290' preserving integrity in the database and maintaining transactional properties. Preserving the database integrity and the transactional properties requires the abort of transactions not yet committed by the service where the transaction service cannot guarantee data integrity in carrying on with the transaction in the face of the takeover.

Life of a Transaction Flush

Transaction flushing occurs as the result of either the transaction beginner application's invoking the transaction service DLL 2A0 to commit the transaction, a transaction participant's invoking the transaction service to abort the transaction, the failure of the transaction beginner, or selected multiple failures that confuse the transaction service as to whether it can preserve data integrity in carrying on with a potential commit.

According to a preferred embodiment, a transaction flush includes three phases when it operates in a cluster of SMP computers (each of which may be a network distributed operation), depending on the node location of the involved elements on the cluster. First, the transaction owner causes the resource managers 2B1 to flush their respective database updates to the input buffer of the Log 2B2 and collects the flush responses. Second, the transaction owner reports the results of the flush to the primary commit coordinator 290 (which then synchronizes the flush result with the backup commit coordinator 290, as described herein). Third, the commit coordinator 2B0 force-writes the commit or abort record onto the Log disk. In the process, the commit coordinator 2B0 forces out any database updates remaining in the Log buffer.

A transaction flush is idempotent or retryable such that one transaction always results in one or more flushes. Flush operations are repeated until one flush is paired with a successful database transformation or until an operator takes offline the resource manager 2B1 blocking that transformation. Database transformations in the forward direction are committed, those in the reverse direction, aborted.

Phase One: Flush Broadcast

In phase one, the transaction owner causes the resource managers 2B1 to flush their database updates to the Log's input buffer and collects the flush responses. Once the transaction flush is begun, the transaction service in the execution space 260 where it began owns that flush broadcast and maintains responsibility for coordinating it until the transaction service in that execution space 260 fails. The broadcast owner's execution space 260 for the transaction is the execution space 260 of the transaction owner, i.e, either the transaction beginner, if it has survived, or the transaction service of the primary commit coordinator 290. (The original backup of the commit coordinator may now be the primary as the result of the same or another failure.) If the beginner fails, for example, the transaction service associated with the execution space 260 of the flush-broadcast owner invokes flushing with the intent to abort.

A flush broadcast for a transaction consists of a set of flush request datagrams followed by a set of flush reply datagrams that map to the request set—but not necessarily in a one-for-one pairing. For every synchronized execution space 260, including the execution space 260 of the transaction owner coordinating the flush, one flush reply datagram exists. The set of flush request datagrams preceding those flush replies is reduced in number to optimize performance.

Data integrity demands that, before an execution space 260 makes any flush reply for a transaction, every resource manager 2B1 that updated for that transaction and that is associated as a primary 290 (as opposed to the backup 290 for the fault-tolerant process pair 2BX) in connection with that execution space 260 write to the Log's input queue all information necessary for a subsequent recovery operation after a failure. (Recovery operations include transaction rollback or undo due to abort [backout], resource manager crash rollback [volume recovery], total system crash recovery or restart, and total media failure or loss recovery [file recovery].) Such information as is necessary for these operation to complete in the resource manager 2B1 is in the Log and available at recovery time.

In wide area networks (WANs) or system-area network (SANs, e.g., ServerNet, available from the Assignee of the instant invention), where all messaging is point-to-point, only one transaction flush request datagram is sent to each node 210 containing one or more execution spaces 260, and inside that node 210 a datagram is propagated by memory-copy to each execution space 260.

Figure 3:
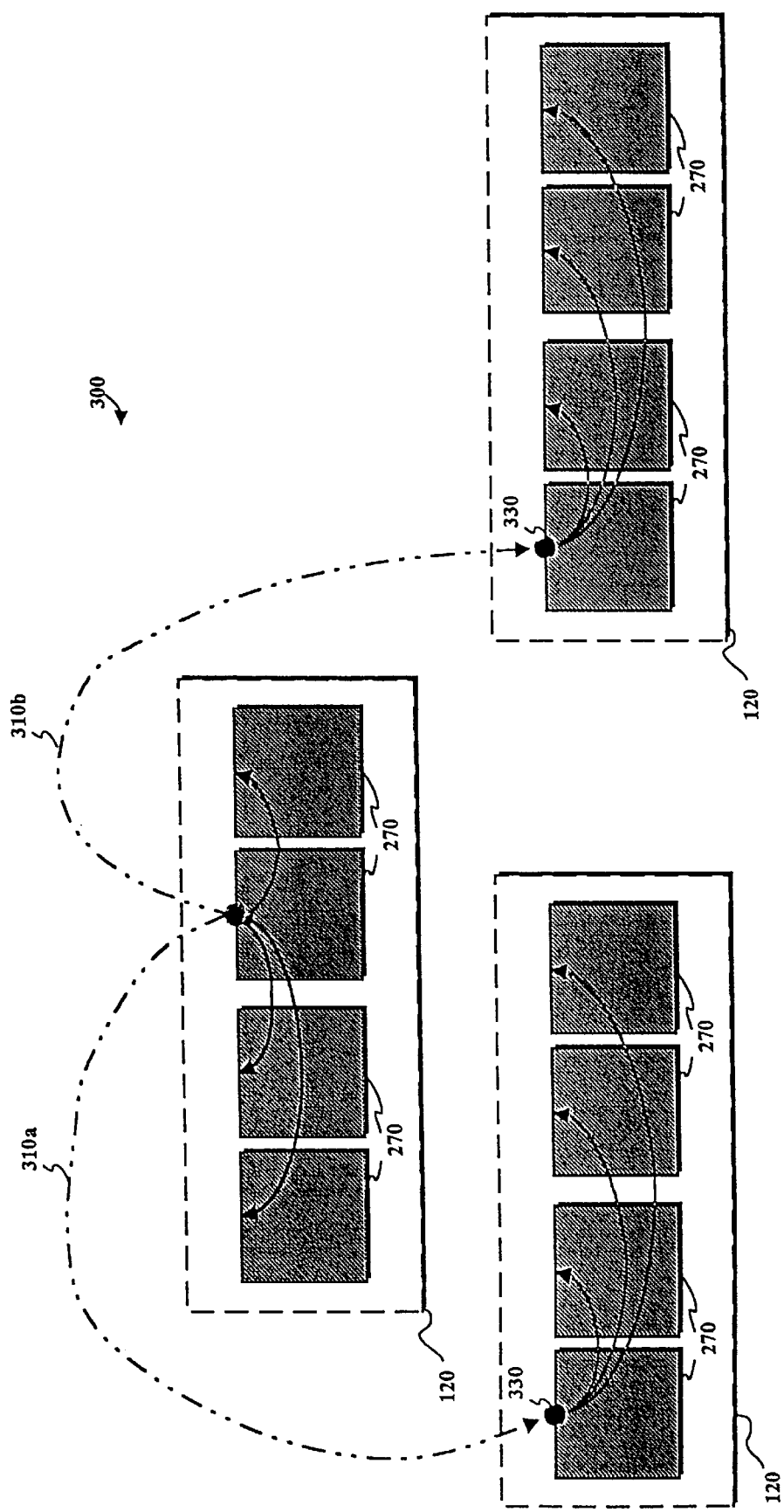
FIG. 3 illustrates point-to-point messaging.

FIG. 3 illustrates such point-to-point messaging. In FIG. 3, a WAN or SAN flush broadcast on a cluster 300 of three SMP nodes 120 (each having four processors 270) includes two network datagrams (represented by the dashed arrows 310), nine memory-copy datagrams (represented by the solid arrows 320), and three self-send datagrams (represented by the dots 330).

Figure 4:
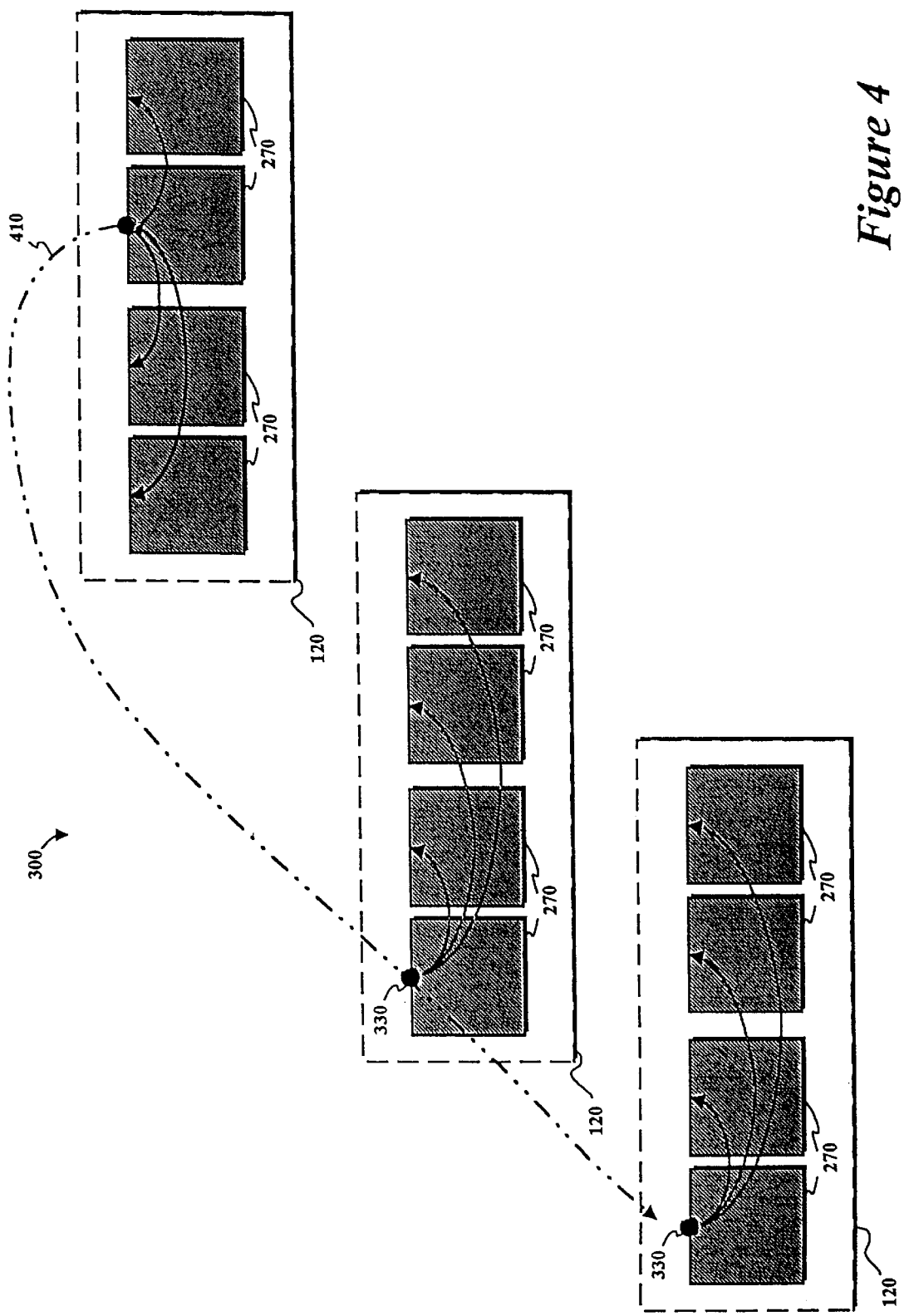
FIG. 4 illustrates an optimization for local area networks.

FIG. 4 illustrates an optimization for local area networks (LANS, e.g., User Datagram Protocol/Internet Protocol [UDP/IP] sockets over Ethernet subnets). The optimization includes sending a single multicast datagram. The receiving processors 270 then propagate this multicast datagram by memory-copy to each execution space 260 in every SMP node 210. Thus, with the optimization of FIG. 4, a LAN flush broadcast in the cluster 300 includes one network multicast datagram (represented by the dashed arrow 410), nine memory-copy datagrams (represented by the solid arrows 320) and three self-send datagrams (represented by the dots 330).

Flush requests contain a transaction ID (TID) and a flush epoch. Flush replies contain the TID, epoch and one of three states (Unresolved, Readonly, Updating) for the transaction. This allows any subsequent release of resources to be pursued using a narrowcast or subset broadcast technique.

Epochs sequence flush broadcasts. An epoch is a number that begins at zero and climbs. Every new flush attempt for a transaction increases that transaction's epoch. Commit flushes are performed at epoch zero, while abort flushes are epoch zero or greater. Abort flushes with epoch greater than zero are due to failure of an execution space 260 associated with the transaction beginner, the failure of the containing processor 270, the failure of the containing SMP node 210, or the failure of the entire cluster 200.

After the flush coordinator collects all of the flush reply datagrams for this transaction, phase one is complete.

Since the flush request and reply datagrams use only datagram semantics (flush replies being separate and unpaired from the requests), in one embodiment datagrams are buffered together for better performance. Multicast flush is buffered separately, of course.

Phase Two: Coordinator Synchronization

The synchronization phase reports the collected flush broadcast results for one epoch to the commit coordinator pair 2B0 and 2B0'. A "Flushed" transaction report is broadcast via datagram into the execution space 260 to which the primary commit coordinator 2B0 is attached.

The datagram that is the final flush reply completing the flush broadcast results from a network message or a memory-copy message between two execution spaces 260 in the same SMP node 210, or inline with the execution of the original flush call (if this is the only execution space 260 configured or currently up). Out of that event in the execution space 260 of the broadcast owner (the transaction service under the original application that attempted to commit the transaction), an "I'm Flushed" datagram is sent to the transaction service in the execution space 260 containing the primary commit coordinator.

Sending a datagram from the broadcast owner's execution space 260 into the execution space 260 of the primary commit coordinator 2B0 (instead of a message directly into the process) narrows the window for loss of flush information. If the primary commit coordinator process 2B0 has recently failed or given over its primacy to the backup commit coordinator process 290, then another two failures are needed to lose the flush information from the two execution spaces 260 (of the beginner and the former primary commit coordinator 290) now containing it.

Once the datagram arrives in the execution space 260 of the primary commit coordinator 290, it can be queued to that process. When it is dispatched, the primary commit coordinator 290 dequeues the flushed transaction report and creates a context for that transaction.

The primary 290 then synchronizes the backup commit coordinator 290 with the transaction and its flush results by sending it a message-system message containing the sharable part of the transaction context. This context contains sufficient transaction-location and flush-result information to make the results of this transaction flush durable.

Once the message sent to the backup commit coordinator 2B0 has been acknowledged, the primary and backup commit coordinators 2B0 and 2B0' are synchronized on this transaction and this second phase is complete.

Phase Three: Force-Write Log

The force-write of transaction state record by the primary commit coordinator into the Log terminates the three-phase flush operation and makes a boundary between the processing-and-flushing cycles in the larger transaction protocol.

Once the primary and backup commit coordinators 2B0 and 2B0' have synchronized, the primary commit coordinator 290 can send the record to the Log 2B2 in a message-system message, directing it to write it onto the Log disk before replying to the message. This direction is a forced write to the Log 2B2. Alternatively, the Log 2B2 replies to the message when it arrives into the input buffer of the Log 2B2, so that multi-buffered Log writes are possible. Then the information that a Log write has made it to the Log disk is in a subsequent message reply or in a separate message or datagram back to the primary commit coordinator 290 or its execution space 260.

Buffering up transaction state records in the primary commit coordinator 290 before sending them to the Log 2B2 accomplishes Group Commit. Holding up the queued flushes for some duration in the second, Coordinator-Synchronization phase accomplishes Group Commit in an alternative manner. When the datagram arrives in the execution space 260 of the primary commit coordinator 290, it can be deferred-queued to that process. When a short duration of time for collection elapses, the primary commit coordinator 290 is dispatched and dequeues the deferred flushed transaction reports and batch-synchronizes them with the backup commit coordinator 290 and batch-force-writes them into the Log 2B2.

Acknowledgement of the Log write message completes the third phase of the protocol and thus the flush. Any flush following a subsequent database transformation for this transaction is for a later epoch than the epoch used for this completed flush.

The retryable flushing method described herein isolates database transformations to any number of resource managers 2B1 for a given transaction from each other in the Log 2B2, making the flush operation the basic unit of database reliability, integrity and recovery.

Failure Modes

Any element of the cluster 200 hardware and software may fail at any time due to software bugs in the application, middleware or operating system, to hardware component failures, to networking problems or to operator mistakes, for example.

Failure of the Transaction Beginner

Figure 5:
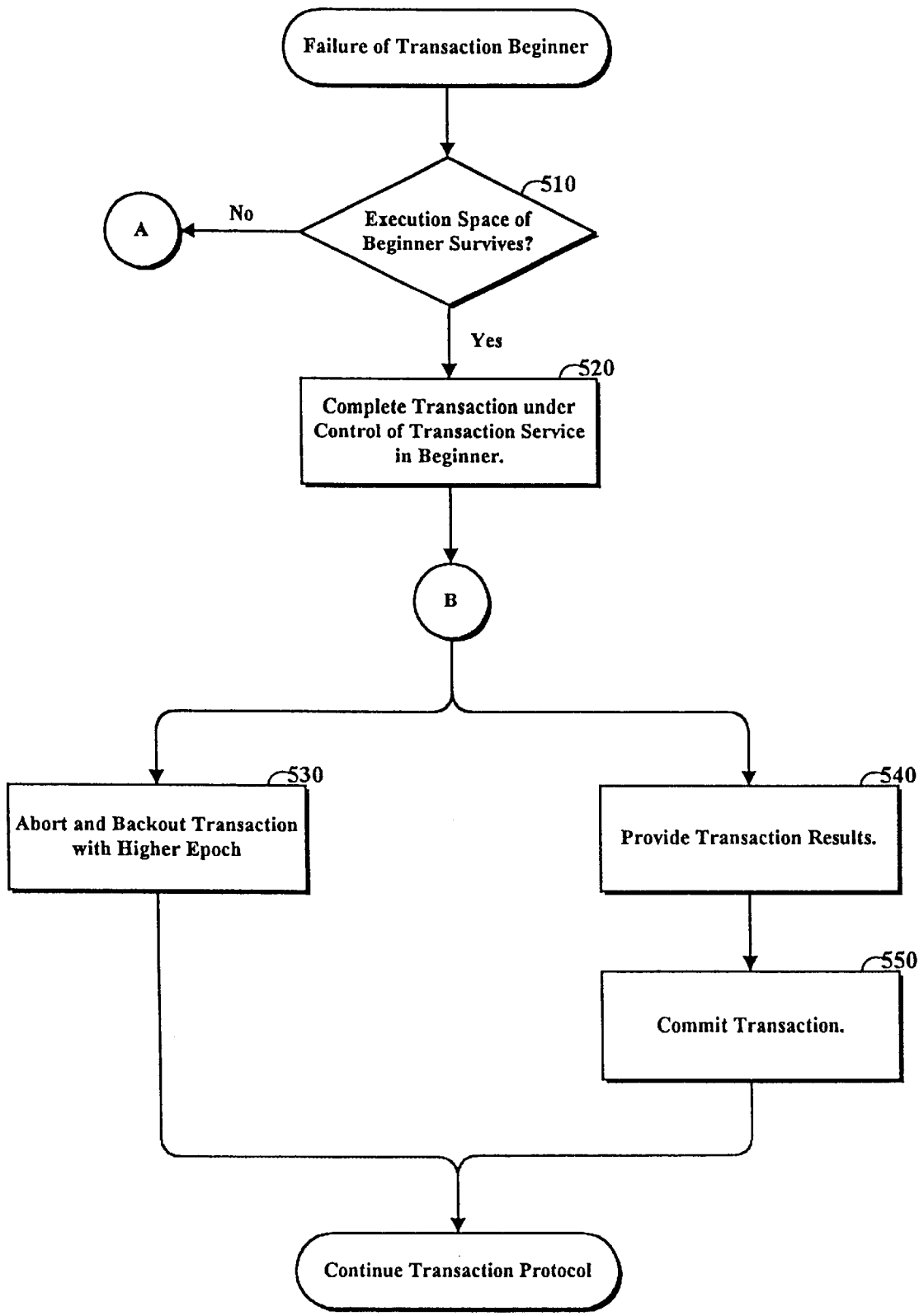
FIG. 5 illustrates control flow when the transaction beginner fails during the flush operation.

The transaction beginner may fail during the flush operation. FIG. 5 is a flow chart illustrating control flow in this situation. As long as the execution space 260 to which the beginner is attached survives the beginner's death, step 510, the three phases of the flush complete under the coordination of the transaction service in the execution space 260 of the beginner, step 520.

Because of the loss of the beginner and the inability to report transaction results to it, the transaction protocol (of which one transaction flush operation is only a part) may decide to abort and backout the transaction with a subsequent and higher epoch flush, step 530.

Alternatively, the transaction protocol may decide to remedy the loss of a commit or abort result to the application by reading that result from the Log 2B2, from the execution space 260 itself (for a limited time), or from some set-aside transaction-result database, step 540. If this mechanism for providing transaction results suffices for the application requirements, the transaction protocol commits the transaction with full integrity (barring other failures affecting the transaction), step 550.

Failure of the Beginner's Execution Space

Figure 6:
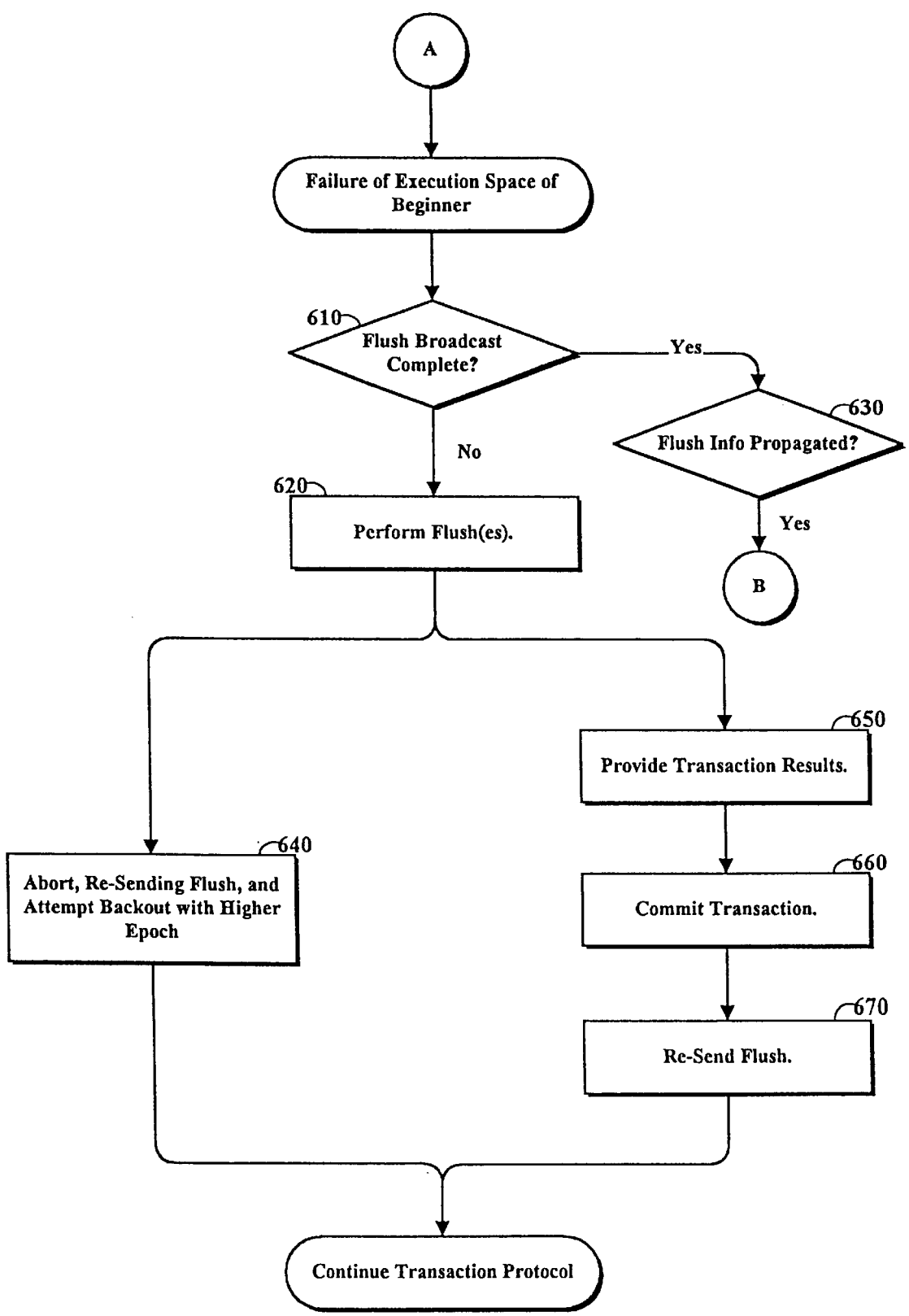
FIG. 6 illustrates control flow when the execution space of the transaction beginner fails during the flush operation.

A failure of the execution space 260 of the beginner causes the loss of any information about the progress of any flush broadcasts in progress and about any flush results reported back from other execution spaces 260 (flush phase one). FIG. 6 is a flow chart illustrating the flow control in this situation. If the flush broadcast has not yet completed when the beginner's execution space 260 fails, step 610, then the flush broadcast is broken and at least one more flush is performed, depending on the requirements of the application, step 620.

At that time the transaction protocol (of which one transaction flush operation is only a part) may decide to abort the transaction with a re-sent flush of the broken epoch (or of an incremented epoch) and then attempt to backout the transaction with a subsequent and higher increment epoch flush than the re-sent one, step 640.

The transaction protocol may decide to remedy the loss of a commit or abort result to the application by reading that result from the Log 2B2, or from some set-aside transaction-result database, step 650. If this mechanism for providing transaction results suffices for the application requirements, the transaction protocol commits the transaction with full integrity (barring other failures affecting the transaction), step 660. The new flush broadcast owner, the execution space 260 where the current commit coordinator primary 290 is attached, re-sends a flush of the broken epoch or an incremented epoch, step 670.

If the flush broadcast has completed at the time of the failure of the beginner's execution space 260, step 610, and if the transaction flushed information has already been propagated to the execution space 260 where the current commit coordinator primary 290 is attached, as is done in coordinator synchronization, then the decision whether to abort is the same as in the beginner-failure case described herein, control point B.

Failure of the Resource Manager Primary

Messages conveying changes in status and database updates subsequently written to the Log 2B2 synchronize resource primary and backup manager process pairs 2B1 and 2B1'. Since all Log updates go to the backup resource manager 290 first, conceivably, no failure ever loses any updates to the Log 2B2. For higher performance, however, in one embodiment the primary resource manager 290 replies to database requests by users before sending those updates to the backup 290, creating a failure window in which updates can be lost, not making it to the log. In addition, defects in the resource manager software may cause a loss or corruption of updates that were previously guaranteed to the user and may cause a software-generated outage for the primary resource manager 290. These lost Log updates may cause a unilateral abort or may cause an attempted rollback of a transaction to fail.

Figure 7:
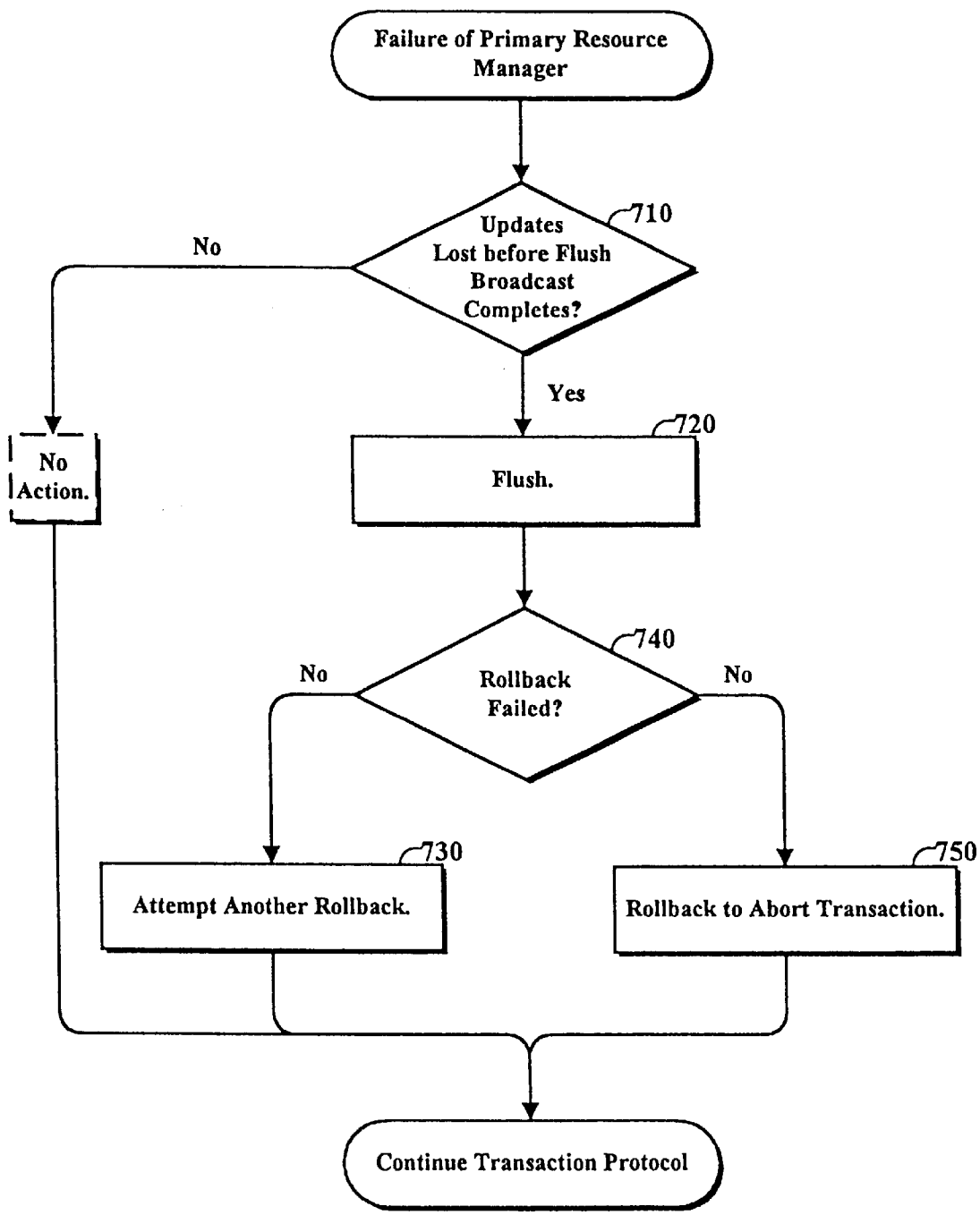
FIG. 7 illustrates control flow when the primary resource manager fails during the flush operation.

In the set of conditions stated above, the loss of a primary resource manager 2B1 does not affect the operation of a flush. If, however, updates to the Log 2B2 are lost before the flush broadcast completes, step 710, the integrity-reinforcing mechanisms of the transaction service perform another flush, step 720. This enables a rollback for aborting a working transaction, step 730, or enables another rollback attempt for a failed rollback of an aborted transaction, step 750. FIG. 7 is a flow chart illustrating control flow when the primary resource manager fails during the flush operation.

Failure of the Resource Manager Primary's Execution Space

Figure 8:
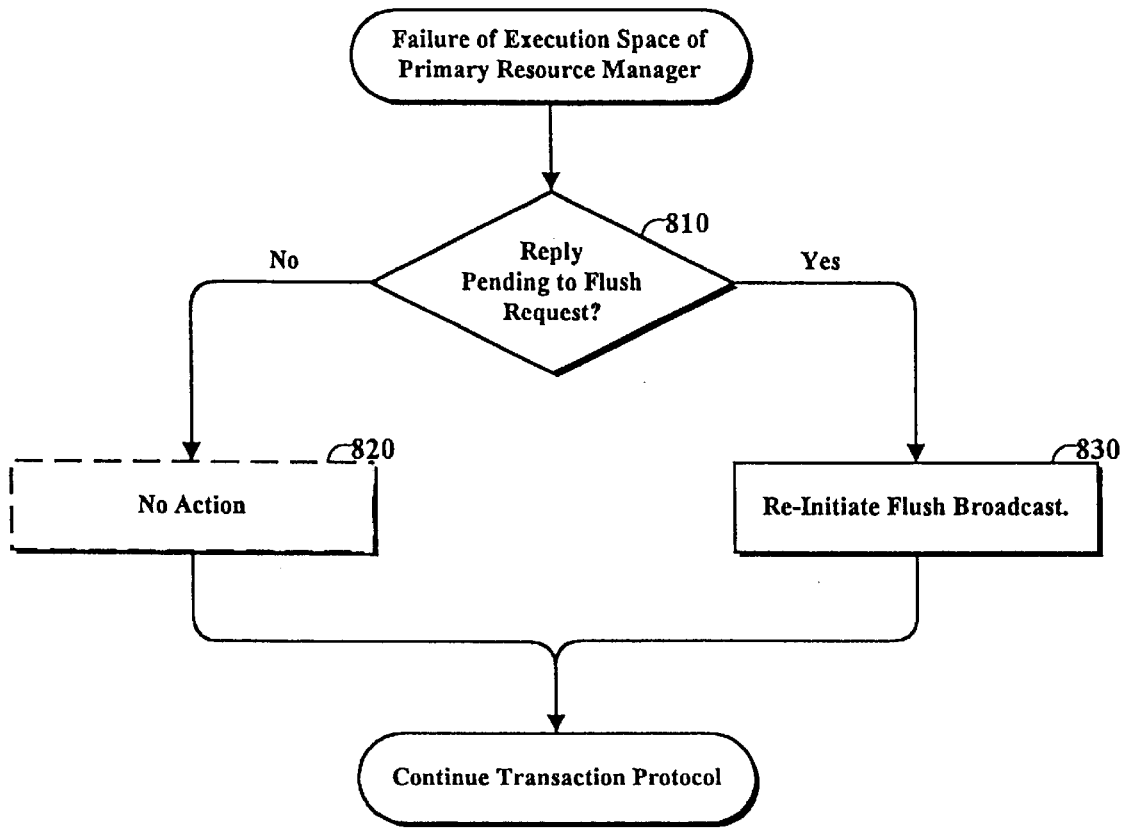
FIG. 8 illustrates control flow when the execution space of the primary resource manager fails during the flush operation.

A single failure of the execution space 260 of the primary resource manager 2B1 (without the loss of any resource manager process pairs 2B1, 2B1') is effectively a failure of all the resource manager primary processes 290 attached to the execution space 260. FIG. 8 illustrates the flow of control in the face of such a failure.

If the execution space 260 has already responded to the flush request with a reply for this transaction, step 810, no further action is needed, step 820.

If the execution space 260 is offline any time prior to the flush broadcast, the transaction protocol does not send it any flush request datagram and does not expect a reply.

If the transaction protocol has sent a flush request datagram, and a flush reply is pending at the time of this failure, step 830, the flush broadcast is broken. The transaction protocol re-initiates these flush broadcasts, step 830.

The transaction protocol requesting the flush does not necessarily feel an effect. Whether updates to the Log are lost in the takeover of any resource manager primary 290 attached to the failed execution space 260 determines the effect, and the loss is handled in the manner described previously, for the failure of a primary resource manager.

Failure of the Resource Manager Backup or its Execution Space

The failure of a resource manager backup 290 involved in a transaction flush or of an execution space 260 to which are attached the backups 290 to resource managers 2B1 involved in a transaction flush is entirely transparent to the flush. The single exception is the creation of a window for the double failure of a resource manager pair 2B1. The handling of this double failure is described herein.

Failure of the Resource Manager Process Pair

Figure 9:
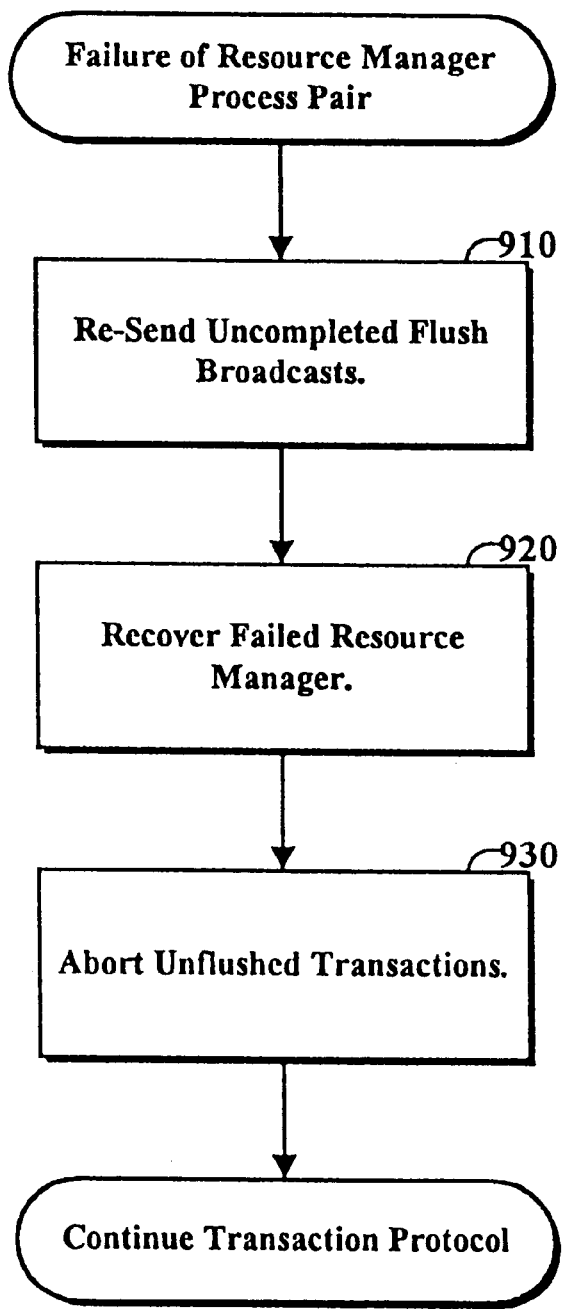
FIG. 9 illustrates the flow of control when a resource manager pair fails.

FIG. 9 is a flow chart illustrating the flow of control when a resource manager pair fails. Any failure of the two process halves 290 of a resource manager process pair 2B1 and 2B1', irrespective of the survival of their attached execution spaces 260, results in all uncompleted transaction flush broadcasts being declared as broken and being resent, step 910. That resource manager 2B1 is, of course, offline and requires recovery as well, step 920.

To maintain database integrity, the transaction protocol (in which a flush operation is only a step) aborts all currently unflushed transactions, step 930.

Failure of the Log Primary

Resource managers 2B1 write into the input buffer of the Log 2B2. The commit coordinator 2B0 forces its Log writes onto the Log disk. All writes are retryable (idempotent). Should the Log primary 2B2 die, those writes are sent to the former-backup-and-now-primary Log 2B2'. Log writes not forced to disk and only arriving into the input buffer of the Log 2B2 before replying to the writing resource manager 2B1 are safe. Messaging to the backup 290 before replying synchronizes these Log writes.

Writes forced to disk before replying are safe.

The failure of the Log primary process 290 does not affect flush broadcasts in progress. Hence those failures are transparent to flushing.

Failure of the Log Primary's Execution Space

The Log primary 290 has little interaction with the execution space 260 with the exception of attachment. Therefore, the loss of that space 260 (barring other effects) is tantamount to the loss of the Log primary 290, as discussed herein.

Failure of the Log Backup or tts Execution Space

The Log backup 290 also has little interaction with the execution space 260, again with the exception of attachment. Likewise, the loss of that space 260 (barring other effects) is tantamount to the loss of the Log backup 290 When the Log backup 290 is offline, a window for double failure of the Log process pair 2B2 occurs, as discussed below. Other than that failure window, the offline Log backup 290 does not affect any transaction flush broadcast.

Failure of the Log Process Pair

Should the Log process pair 2B2 fail or go offline for any reason, the transaction service is in the crashed state or is offline until either half 290 of the Log process pair 2B2 goes online and restores the service.

Failure of the Commit Coordinator Primary

The commit coordinator process pair 2B0 and 2B0' synchronizes its state between the primary 290 and backup 290 using message-system messages. The failure of a commit coordinator primary 2B0 is transparent to any flush operation in progress. The results information for any flush operations that have completed is contained either in the state of the process pair 2B0 and 2B0' (and, therefore, is safe to any primary commit coordinator 2B0 failure), or in the two execution spaces 260 to which the commit coordinator pair 2B0 and 2B0' are attached.

Figure 10:
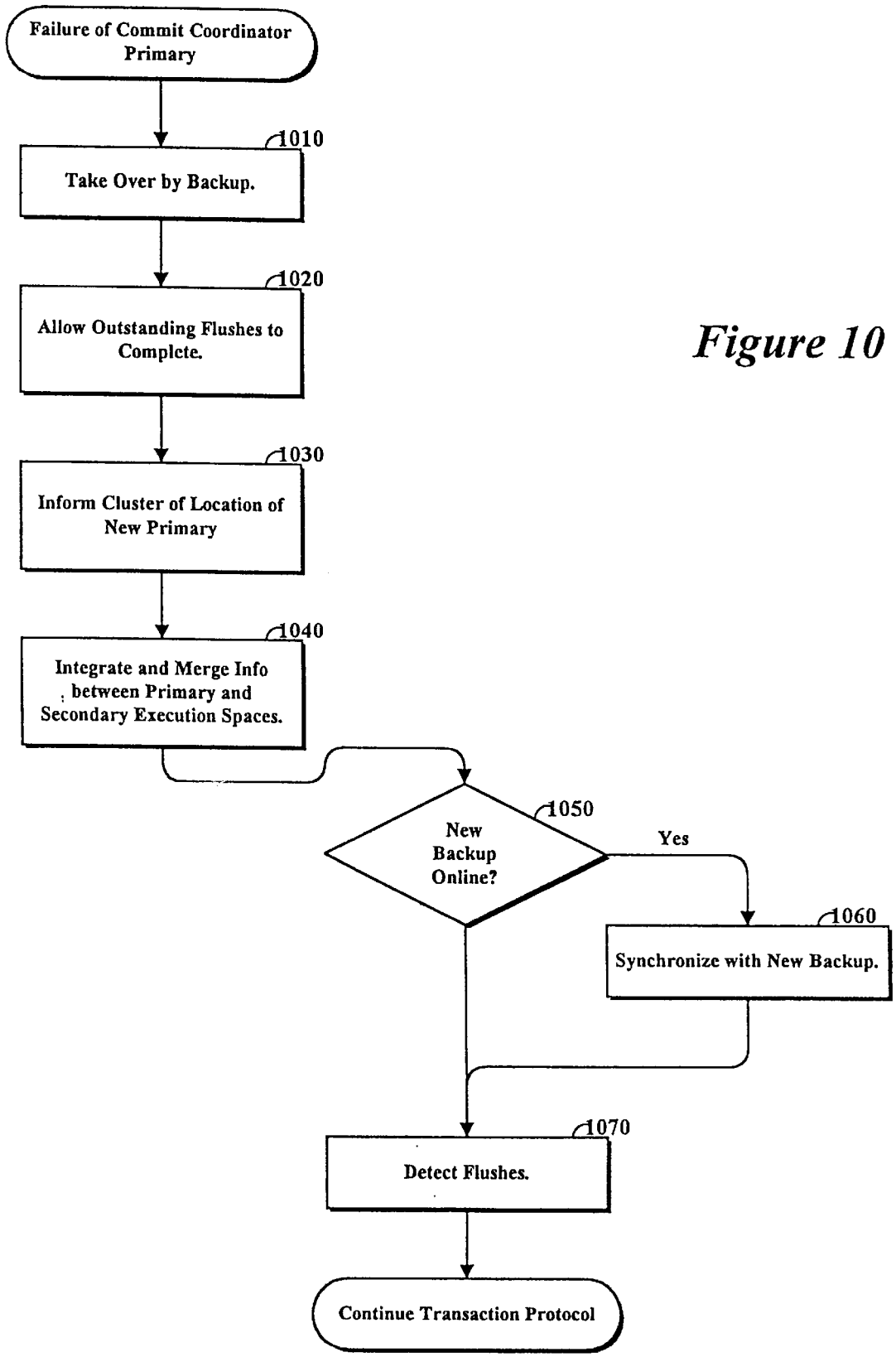
FIG. 10 illustrates the flow of control when the primary commit coordinator fails.

FIG. 10 illustrates the flow of control when the primary commit coordinator fails. At takeover time, step 1010, and after any currently outstanding flushes are allowed to complete, step 1020, the former-backup-and-now-primary commit coordinator 290 drives the integration and merging of flush information between the two commit coordinator execution spaces 260, step 1040 (after the cluster is informed of the location of the new primary, step 1030). After the merge, the new primary commit coordinator 290 detects (and synchronizes, if a new backup commit coordinator 290 is online, steps 1050 and 1060) the flushes not previously detected, step 1020.

Failure of the Commit Coordinator Primary's Execution Space

Figure 11:
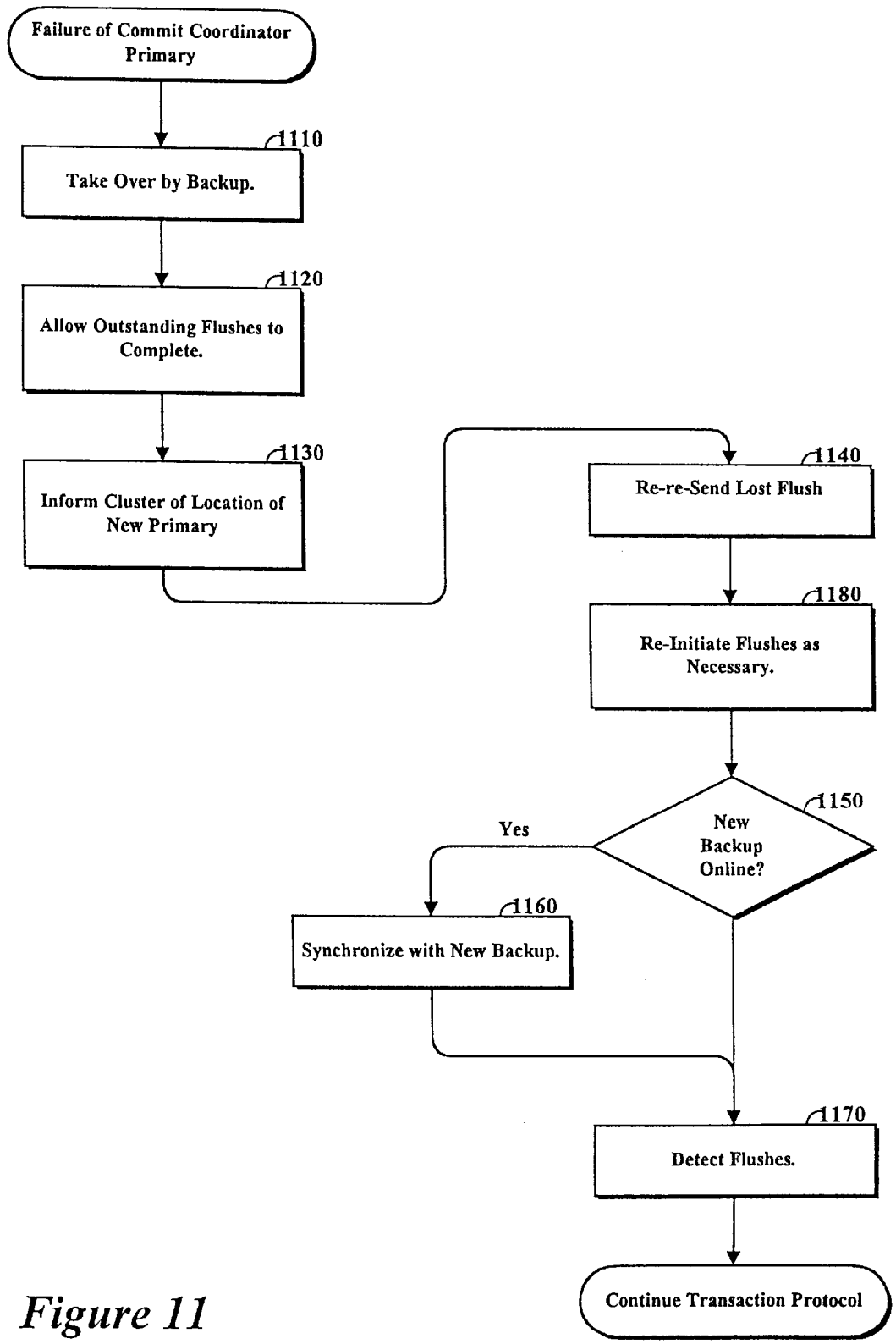
FIG. 11 illustrates the flow of control when the execution space of the primary commit coordinator fails.

Failure of the execution space 260 of the commit coordinator primary 290 removes any need for merging state between the primary and backup commit coordinator execution spaces 260 (step 1040). Correspondingly, some flush information not yet synchronized between the coordinator pair 2B0 is lost. FIG. 11 illustrates the flow of control when the execution space of the primary commit coordinator fails. The beginner's transaction service in every execution space 260 in the cluster re-re-sends that flush information to the new commit coordinator primary's execution space 260, step 1140. Any flush operations required to be re-driven by the new flush broadcast owner for those flushes (the transaction service in the new commit coordinator primary's execution space 260) are now re-initiated, step 1080.

Failure of the Commit Coordinator Backup or its Execution Space

The failure of the commit coordinator 2B0 or its execution space 160 is entirely transparent to any ongoing transaction flush operation. This failure does create a window for double failure of the commit coordinator 2B0 and subsequent transactionservice crash.

Failure of the Commit Coordinator Process Pair

Should the commit coordinator process pair 2B0 fail or go offline for any reason, the transaction service is in the crashed state until either half 290 of the commit coordinator process pair 2B0 goes online and restarts it.

At that time, any transactions unflushed at the time of the transaction service crash are aborted.

Failure of Extraneous Execution Spaces qnd/or Uninvolved Resource Managers

Unless the failure of the uninvolved resource managers 2B1 results in a double failure that would cause the transaction service to abort all unflushed transactions, failures of extraneous execution space 260 and/or uninvolved resource managers 2B1 are completely transaction to flushing the transaction.

Of course, the program text for such software as is herein disclosed can exist in its static form on a magnetic, optical or other disk, on magnetic tape or other medium requiring media movement for storage and/or retrieval, in ROM, in RAM or other integrated circuit, or in another data storage medium. That data storage medium may be integral to or insertable into a computer system.

Also, the embodiments described herein are by way of example and not limitation. Modifications to the invention as described will be readily apparent to one of ordinary skill in the art. Therefore, the metes and bounds of the invention are defined by the claims which follow immediately:

What is claimed is:

1. In a cluster including a plurality of nodes of shared-memory processors, with all nodes connected by a network including a messaging system for implementing communications between nodes and each node implementing memory copying messages for communicating between processors in a node, where a failure of any processor in a node results in the node becoming inoperative, a method for implementing and tolerating faults in a non-blocking three-phase flush algorithm for database transaction commits, said method comprising the steps of:

executing a primary backup of a commit coordinator process pair on a respective first and second different nodes of said plurality of nodes;

executing the primary and backup of a resource manager process pair on nodes of said plurality of nodes;

executing the primary and backup of a Log process pair on nodes in said plurality of nodes, wherein each primary and backup of each of said process pairs has a network presence, and wherein said network presence of a primary is different from said network presence of its respective backup, with said Log process pair for storing log records in a Log buffer and non-volatile storage;

for a particular trasaction, issuing a flush broadcast by a transaction owner of the particular transaction that causes all resource managers involved in the particular transaction to flush their respective database updates to input buffers controlled by the Log process pair and collecting flush responses to determine the results of the flush broadcast;

reporting, by the transaction owner, the flush results to the primary commit coordinator executing on the first node;

synchronizing the flush results on the backup commit coordinator operating on the second node; and subsequent to said synchronizing step, force writing, by the primary commit coordinator, a commit or abort record onto a non-volatile Log memory.

2. The method of claim 1 where execution spaces are formed in the shared memory of each node, with at least one execution space corresponding to each processor in the node and with processes attaching to execution spaces wherein said step of synchronizing further comprises the step of:

sending checkpoint messages from a first execution space in the first node to which the primary commit coordinator is attached to a second execution space in the second node to which the backup commit coordinator is attached.

3. A method for performing a non-blocking flush operation, with the method executed in a system having a plurality of nodes of shared-memory processors, with all nodes connected by a network including a messaging system for implementing communications between nodes and each node implementing memory copying messages for communicating between processors in a node, where a failure of any processor in a node results in the node becoming inoperative, with the system including a transaction service including a commit coordinator, resource managers, and a Log, all implemented as fault tolerant process pairs with the commit coordinator process pair having a primary commit coordinator executing on a first node and a backup commit coordinator operating on a different second node, said method comprising the steps of:

for a particular transaction, issuing a flush broadcast by a transaction owner of the particular transaction that causes all resource managers involved in the particular transaction to flush their respective database updates to input buffers controlled by the Log processes and collecting flush responses to determine the results of the flush broadcast;

reporting, by the transaction owner, the flush results to the primary commit coordinator executing on the first node;

synchronizing the flush results on the backup commit coordinator operating on the second node; and subsequent to said synchronizing step, force writing, by the primary commit coordinator, a commit or abort record onto a non-volatile Log memory.

4. In a system having a plurality of nodes of shared-memory processors, with all nodes connected by a network including a messaging system for implementing communications between nodes and each node implementing memory copying messages for communicating between processors in a node, where a failure of any processor is a node results in the node becoming inoperative, with the system including a transaction service including a commit coordinator, resource managers, and a Log, all implemented as fault tolerant process pairs with the commit coordinator process pair having a primary commit coordinator executing on a first node and a backup commit coordinator operating on a different second node, with each shared-memory coupled to said processors comprising a computer usable medium having a computer readable program code means embodied therein, said computer readable program code means including:
computer readable program code means for causing, for a particular transaction, a transaction owner of the particular transaction to issue a flush broadcast that causes all resource managers involved in the particular transaction to flush their respective database updates to input buffers controlled by the Log processes and collecting flush response to determine the results of the flush broadcast;

computer readable program code means for causing the transaction owner to report the results to the primary coordinator executing on the first node;

computer readable program code means for causing the backup commit coordinator to synchronize the flush results on the backup commit coordinator operating on the second node; and computer readable program code means for causing, subsequent to said synchronizing step, said primary commit coordinator to force write coordinator, a commit or abort record onto a non-volatile Log memory.

5. A system including a plurality of nodes of shared-memory processors, with all nodes connected by a network including a messaging system for implementing communications between nodes and each node implementing memory copying messages for communicating between processors in a node, where a failure of any processor in a node results in the node becoming inoperative, with the system including a transaction service including a commit coordinator, resource managers, and a Log, all implemented as fault tolerant process pairs with the commit coordinator process pair having a primary commit coordinator executing on a first node and a backup commit coordinator operating on a different second node, said system comprising:

a first processor configured, for a particular transaction, to execute a transaction owner of the particular transaction that issues a flush broadcast that causes all resource managers involved in the particular transaction to flush their respective database updates to input buffers controlled by the Log processes and collecting flush responses to determine the results of the flush broadcast;

with the transaction owner reporting the results to the primary commit coordinator executing on the first node; and a second processor configured to execute the primary commit coordinator to send messages to the backup commit coordinator to synchronize the flush results on the backup commit coordinator operating on the second node; and with the primary commit coordinator, subsequent to said synchronizing step, force writing a commit or abort record onto a non-volatile Log memory.

* * * * *

UNITED STATES PATENT AND TRADEMARK OFFICE
CERTIFICATE OF CORRECTION

PATENT NO. : 6,338,146 B1
DATED : January 8, 2002
INVENTOR(S) : Charles S. Johnson et al.

Page 1 of 1

It is certified that error appears in the above-identified patent and that said Letters Patent is hereby corrected as shown below:

<u>Title page,</u>
Item [75] reads,
"Inventors: Charles S. Johnson, San Jose; Shang-Shen Tung, Cupertino; Y.C. Cheung, San Jose; Muhammad Shariq, El Granada, all of CA (US)";
It should read,
-- Inventors: Charles S. Johnson, San Jose; Shang-Shen Tung, Cupertino; Yu-Cheung Cheung, San Jose; Muhammad Shafiq, El Granada, all of CA (US) --;

<u>Column 13,</u>
Line 21, reads "processes and collecting slush response to determine"; should read -- processes and collecting slush responses to determine --

Signed and Sealed this

Twenty-third Day of April, 2002

*Attest:*

*Attesting Officer*

JAMES E. ROGAN
*Director of the United States Patent and Trademark Office*